(12) United States Patent
Smith et al.

(10) Patent No.: US 7,230,690 B2
(45) Date of Patent: Jun. 12, 2007

(54) COLOR MEASUREMENT FEATURE FOR INFORMATION HANDLING SYSTEM ENCLOSURE

(75) Inventors: Randall T. Smith, Liberty Hill, TX (US); David Williams, Salado, TX (US)

(73) Assignee: Dell Products L.P., Austin, TX (US)

( * ) Notice: Subject to any disclaimer, the term of this patent is extended or adjusted under 35 U.S.C. 154(b) by 432 days.

(21) Appl. No.: 10/818,784

(22) Filed: Apr. 6, 2004

(65) Prior Publication Data
US 2005/0219510 A1  Oct. 6, 2005

(51) Int. Cl.
*G01N 21/00* (2006.01)
(52) U.S. Cl. ........................................ 356/73
(58) Field of Classification Search ............... 356/73; 264/40.1; 425/169
See application file for complete search history.

(56) References Cited

U.S. PATENT DOCUMENTS

| | | | |
|---|---|---|---|
| 5,452,081 A * | 9/1995 | Wotzka et al. | 356/243.4 |
| 6,297,948 B1 | 10/2001 | Buican et al. | 361/683 |
| 6,330,342 B1 * | 12/2001 | Winter et al. | 356/402 |
| 6,665,178 B2 | 12/2003 | Curlee et al. | 361/687 |
| 6,868,371 B1 * | 3/2005 | Feldman et al. | 264/40.1 |

* cited by examiner

Primary Examiner—Gregory J. Toatley, Jr.
Assistant Examiner—Kara Geisel
(74) Attorney, Agent, or Firm—Hamilton & Terrile, LLP; Gary W. Hamilton

(57) ABSTRACT

A method and apparatus for ensuring consistency of color and cosmetic appearance of injection molded parts used in the fabrication of enclosures for information handling systems. A sample of polymer material having a texture and color in accordance with a predetermined specification is inspected by a spectrophotometer and the results of the measurements are stored in a cosmetic feature database of a manufacturing system. A plurality of enclosures for the information handling systems are then manufactured using information stored in the cosmetic feature database. Each of the enclosures has a molded feature that can be used to verify surface finish quality and color consistency of the injection molded parts used to fabricate the enclosure. In a production run for fabricating a plurality of enclosures, one of the enclosures can be removed from the production line and a molded feature can be inspected to determine whether the molded parts comply with predetermined standards for color and surface finish.

20 Claims, 5 Drawing Sheets

COLOR MEASUREMENT FEATURE FOR INFORMATION HANDLING SYSTEM ENCLOSURE

BACKGROUND OF THE INVENTION

1. Field of the Invention

The present invention relates generally to information handling systems and, more particularly, to a method and apparatus for ensuring consistency in the cosmetic appearance of enclosures for information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system, such as a desktop personal computer, typically includes a metal chassis for mounting the circuit boards and other functional components. To provide for an aesthetically pleasing appearance and for various functional purposes, an enclosure comprising a variety of panels is used to cover portions of the chassis. Typically, the front of the chassis is covered with a bezel panel, and the top and sides of the chassis are covered by plastic panels. The various plastic panels of the information handling system enclosure are generally formed by molding a polymer material that is colored to provide a desirable cosmetic appearance. Various types of resins are used to fabricate the plastic panels and to provide the desired colors.

Examples of enclosures for information handling systems are disclosed in the following patents: U.S. Pat. No. 6,297,548, entitled "Panel Mounting System," issued to Buican et al on Oct. 2, 2001; U.S. Pat. No. 6,356,436, entitled "Panel Mounting System," issued to Buican et al on Mar. 12, 2002; and U.S. Pat. No. 6,665,178, entitled "Desktop Computer Chassis with Folding Cover," issued to Curlee on Dec. 16, 2003. Each of the aforementioned patents is incorporated by reference herein for all purposes.

In large-scale manufacturing systems, it is important to maintain consistency of color and of the surface texture or surface finish of molded parts over a long production run. Current techniques for measuring the color of molded parts are not consistent with procedures for color measurement of resins. Resins are typically measured by both a visual method and a numeric method, with the visual method being the controlling factor. Molded parts fabricated using resins are generally measured using visual methods, which can lead to inconsistencies that become more exaggerated as the colors become darker, and visual inspection methods are generally less effective.

Many manufacturers produce injected molded parts for information handling system enclosures using a product part approval process wherein the parts are dimensionally qualified through statistical metrics. The specific cosmetic features relating to the molded parts are contained in a chassis cosmetic specification. Adherence to the cosmetic specifications are currently performed utilizing a visual process similar to that used in prior art chip visual qualification processes. Over time, however, variables in tooling, environmental factors and machine parts cause variations in the cosmetics of the molded parts. Throughout the life of a manufacturing process, product cosmetics and colors can vary significantly, leading to undesirable inconsistencies in the manufactured products.

In view of the foregoing, there is a need for an improved method and apparatus for ensuring consistency in the cosmetic appearance and the color of injection molded parts used in computer enclosures.

SUMMARY OF THE INVENTION

The method and apparatus of the present invention overcomes the difficulties of the prior art by providing an improved system for ensuring consistency of color and cosmetic appearance of injection molded parts used in the fabrication of enclosures for information handling systems. In the method and apparatus of the present invention, a sample of polymer material having a color and surface texture or surface finish in accordance with a predetermined specification is inspected by a spectrophotometer and the results of the measurements are stored in a cosmetic feature database of a manufacturing system. A plurality of enclosures for the information handling systems are then manufactured and each of the enclosures has a molded feature that can be used to verify surface texture or surface finish quality and color consistency of the injection molded parts used to fabricate the enclosure. In a production run for fabricating a plurality of enclosures, one of the enclosures can be removed from the production line and a molded feature can be inspected to determine whether the molded parts comply with predetermined standards for color and for surface texture or surface finish. In one embodiment of the invention, the geometry of the feature comprises a one inch square that can be analyzed using a spectrophotometer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Overview

Figure 1:
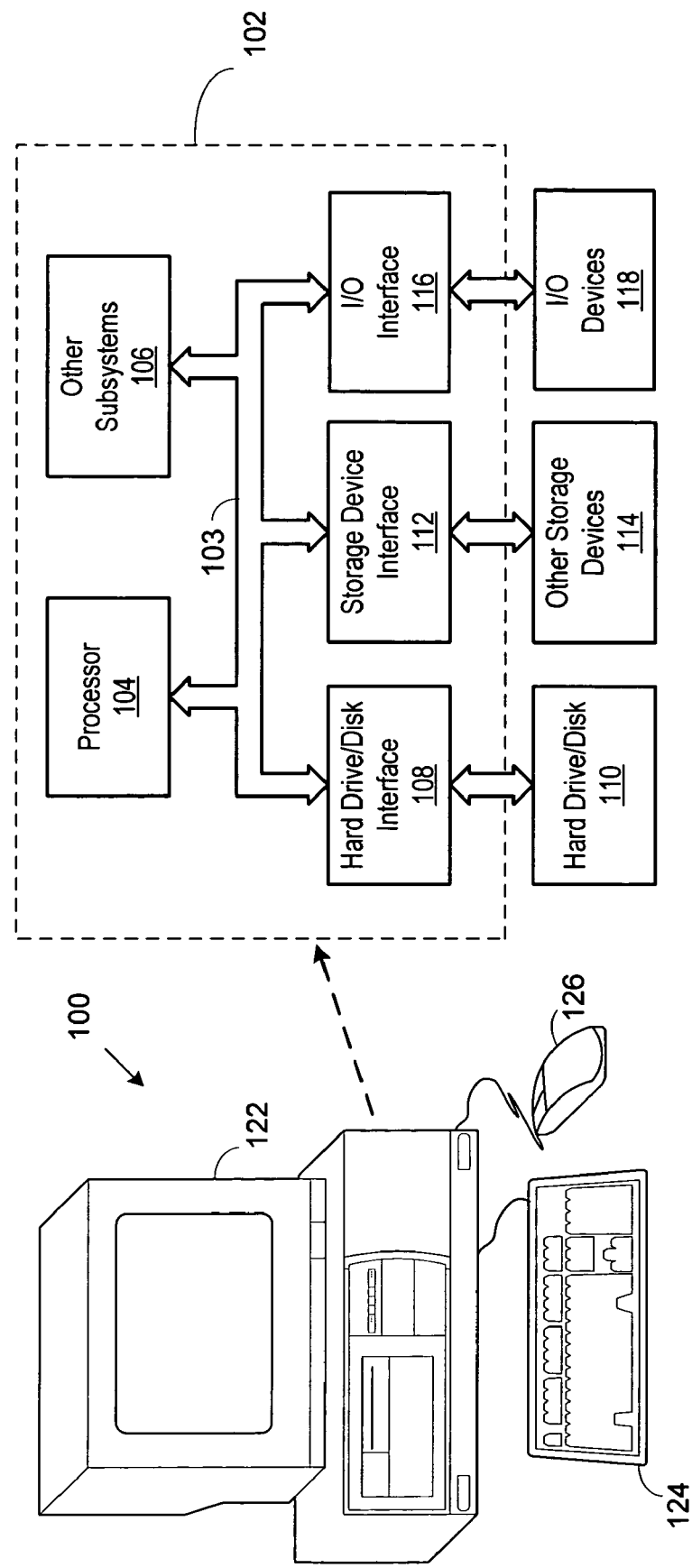
FIG. 1 is a block diagram illustrating the major modules of an information handling system.

The method and apparatus of the present invention provides significant improvements in the manufacture of enclosures, or cases, for an information handling system 100, such as the one shown in FIG. 1. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, an information handling system 100 includes a main system board 102 that comprises a processor 104 and various other subsystems 106 understood by those skilled in the art. Data is transferred between the various system components via various data buses illustrated generally by bus 103. A hard drive 110 is controlled by a hard drive/disk interface 108 that is operably connected to the hard drive/disk 110. Likewise, data transfer between the system components and other storage devices 114 is controlled by storage device interface 112 that is operably connected to the various other storage devices 114, such as CD ROM drives, floppy drives, etc. An input/output (I/O) interface 118 controls the transfer of data between the various system components and a plurality of input/output (I/O) devices, such as a display 122, a keyboard 124, and a mouse 126.

Figure 2:
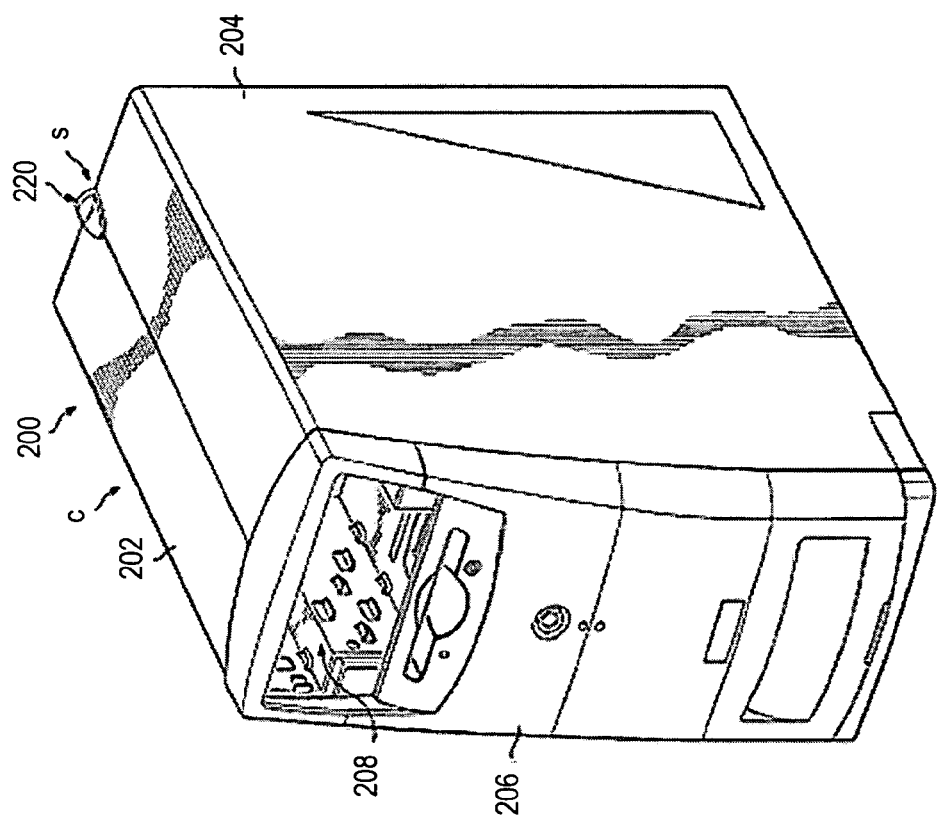
FIG. 2 is an illustration of an enclosure for an information handling system in the closed position.

An embodiment of an enclosure 200, or case, for an information handling system is illustrated in FIG. 2. The enclosure 200 includes a removable panel 202, a stationary panel 204 and a front bezel panel 206 attached to a chassis 208. The removable panel 202 is pivotally attached to the chassis 208 and is removable to provide access to contents attached to the chassis 208. The stationary panel 204 may also be removed, but is typically a stationary panel in operation since the contents within the chassis 208 are not generally accessible.

Figure 3:
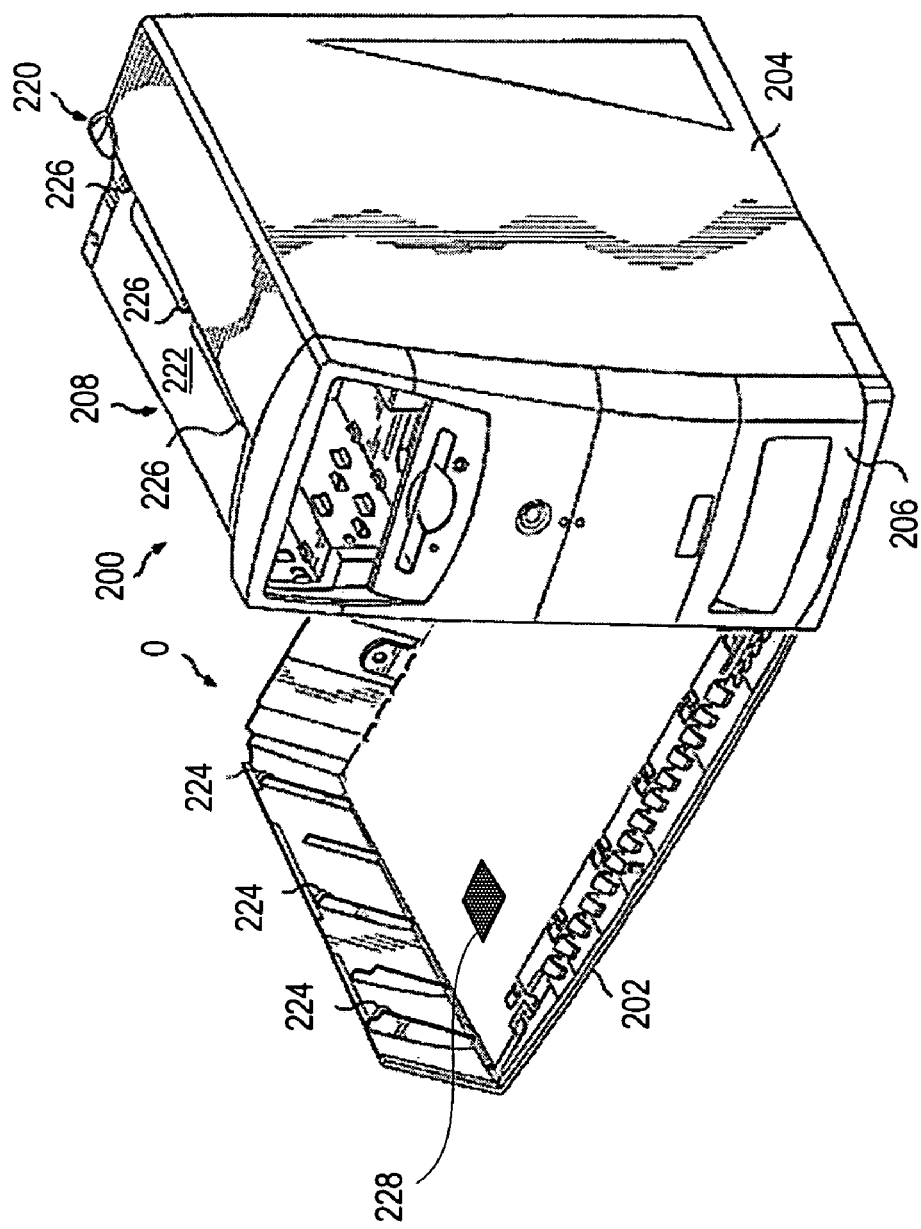
FIG. 3 is an illustration of an enclosure for an information handling system in the open position.

The removable panel 202 is movable between a closed position C, illustrated in FIG. 2, and an open position O, illustrated in FIG. 3. A latch 220 is attached to a top portion 222 of the chassis 208, as illustrated in FIG. 3. The removable panel 202 includes retaining members 224, illustrated in FIG. 2, and the latch 220 includes catch portions 226 that engage the retaining members 224 to retain the removable panel 202 in the closed position C as shown in FIG. 3. The removable panel 202 is retained in the closed position C when the latch 220 is in a static position S, as illustrated in FIG. 1. The interior of panel 202 comprises a molded inspection feature 228. In a first embodiment of the present invention, the molded inspection feature 228 is fabricated using the same type of tooling that is used to fabricate the various panels that comprise the information handling system enclosure 200. In the first embodiment of the invention, the molded inspection feature has the same surface finish or texture as the exterior portion of the panel. In an alternate embodiment of the invention, the molded inspection feature is has a polished finish. In an embodiment of the present invention, the molded inspection feature 228 is located on an interior portion of one of the panels, such as the interior portion of panel 202. In alternate embodiments of the invention, however, the molded inspection feature 228 can be located on external portions of the panels of the enclosure 200. The molded inspection feature 228 will have the same color characteristics as the material used to form the other panels comprising the enclosure 200.

As was discussed hereinabove, during large-scale manufacturing operations, the resins used to fabricate the molded injection parts can have variations over time that can lead to inconsistencies in color and surface texture or surface finish. In addition, it is common for the manufacturing tools to degrade over time, thereby leading to inconsistencies in the surface texture or surface finish of the injection molded parts. In the method and apparatus of the present invention, the molded inspection feature 228 can be removed as described hereinbelow to allow the injection molded parts to be inspected during the production run.

The initial qualification of a resin color in the manufacturing system of the present invention begins with the evaluation of a colored sample which is examined in accordance with the guidelines set forth in a cosmetic specification. Once the colored chips have been qualified, the tooling and material specifications in the manufacturing database are updated to include the data relating to the resin type and color number.

Figure 4:
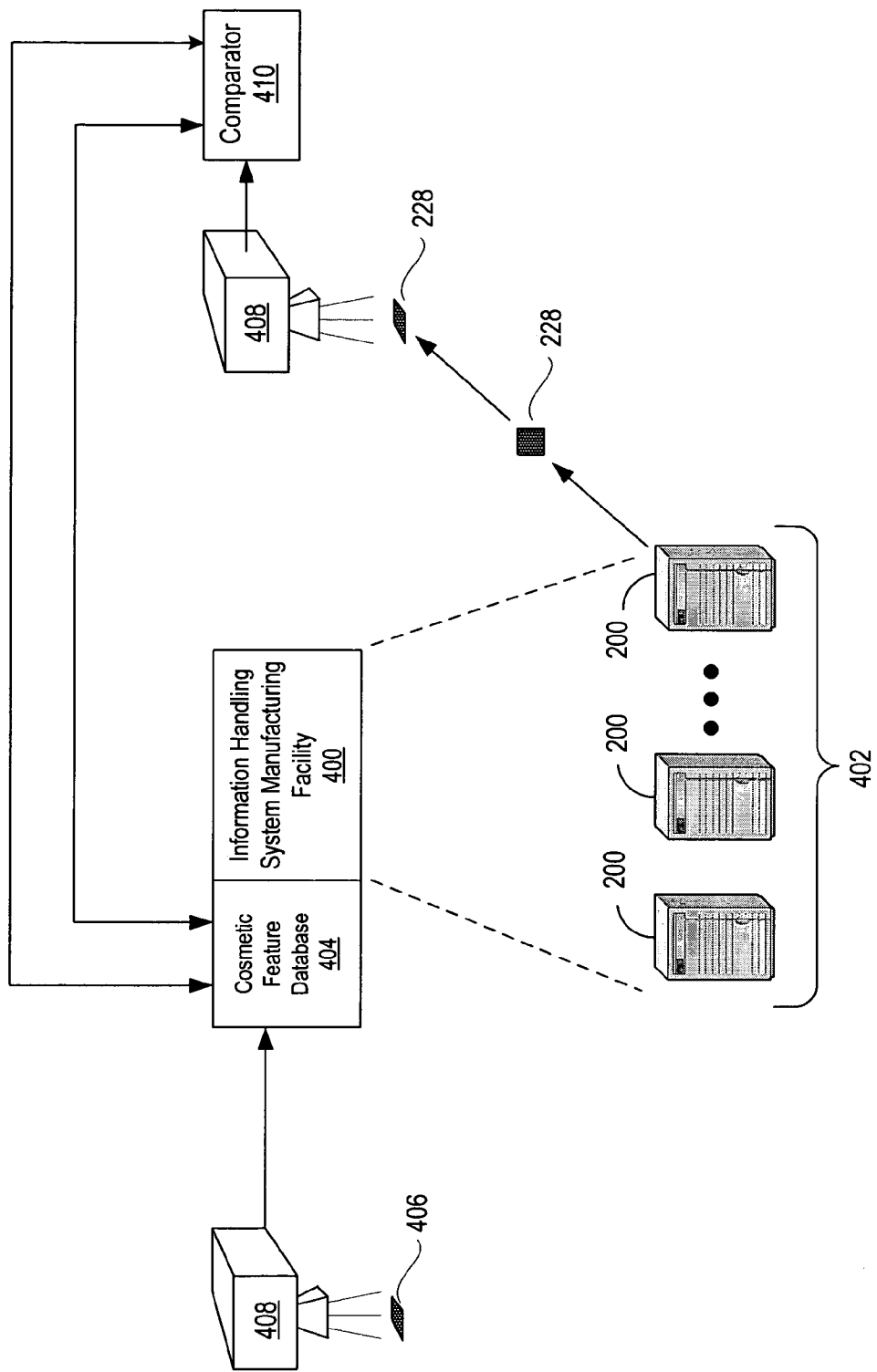
FIG. 4 is an illustration of an embodiment of the method and apparatus of the present invention for measuring color and surface texture or surface finish of materials for enclosures for information handling systems.

FIG. 4 is an illustration of the functional components of a system for implementing the color and surface texture or surface finish measurement for an information handling system enclosure. A sample of polymer resin material 406 having a surface texture or surface finish and color in accordance with a predetermined specification is inspected by a spectrophotometer 408, and the results of the measurement are stored in a cosmetic feature database 404. The data stored in the cosmetic feature database 404 is used by an information handling system manufacturing facility 400 to manufacture a plurality of information handling systems 404 comprising enclosures 200 made from the polymer materials specified by the cosmetic feature database 404. Periodically, one of the information handling systems 402 is removed from the production line and the inspection molded feature 228 of the enclosure 200 is removed for inspection. The inspection material 228 is inspected by a spectrophotometer 408, and the results of the measurement are provided to a comparator 410. The comparator 410 is operable to compare the results of the measurement made by the spectrophotometer 408 with the desired cosmetic color and surface texture or surface finish features stored in the cosmetic feature database 404. The following standards may be used as reference for the color specification: 1) ASTM D2244 Standard Method for Instrumental Evaluation of Color Differences of Opaque Materials; 2) ASTM D523 Standard Test Method for Specular Gloss; 3) ASTM D4674 Standard Test Method for Indoor Color Stability; and 4) SPI Plastic Surface Finishes.

Figure 5:
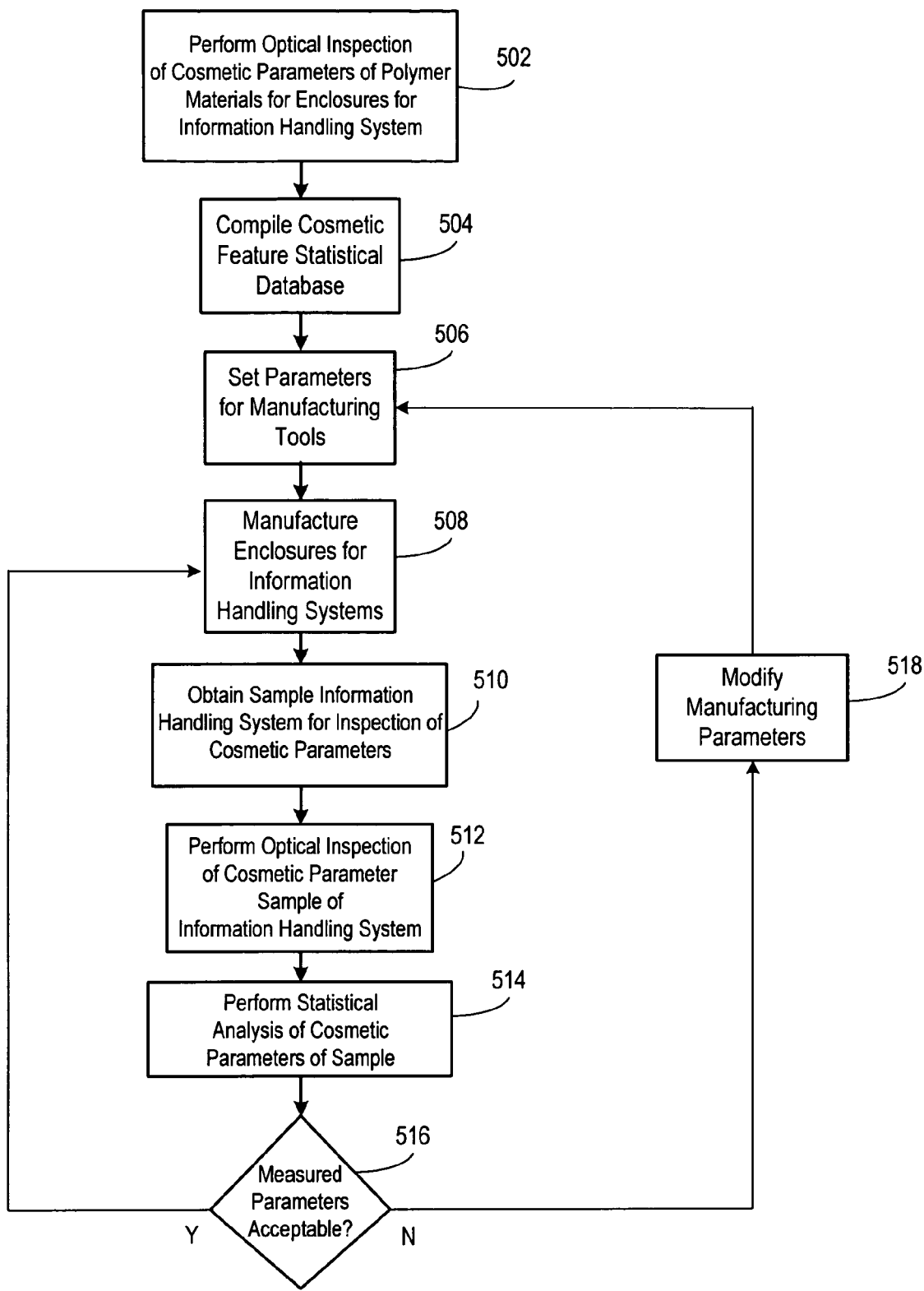
FIG. 5 is a process flow chart illustrating the steps implemented in the method and apparatus of the present invention for color measurement and surface texture or surface finish measurement for an information handling system enclosure.

FIG. 5 is an illustration of the processing steps implemented by the system of the present invention. In step 502, an optical inspection of the color is performed of the cosmetic parameters of the polymer materials used to fabricate enclosures for information handling systems. In step 504, a statistical database of the cosmetic features is compiled for use by the machinery in an information handling system manufacturing facility. In step 506, parameters are set for the manufacturing tools in the information handling system manufacturing facility and in step 508, enclosures for information handling systems are manufactured. In step 510, a sample information handling system is obtained for inspection of cosmetic parameters of a portion of the enclosure. In step 512, an optical inspection of the cosmetic parameters of the sample information handling system is conducted. In step 514, a statistical analysis of the cosmetic parameters of the sample of polymer material from an information handling system is performed, and in step 516 a test is conducted to determine whether the parameters measured for the sample information handling system are in accordance with the parameters specified in a cosmetic feature database. If the results of the test conducted in step 516 indicate that the measured parameters are within the specified parameters for the cosmetic sample, processing returns to step 508, and the enclosures for the information handling systems continue to be manufactured.

OTHER EMBODIMENTS

Other embodiments are within the following claims. The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. An enclosure for an information handling system comprising:
   a plurality of panels fabricated from a polymer material;
   a molded inspection feature on a portion of at least one of said panels, wherein said molded inspection feature is formed on material having the same color characteristics as said panel, and wherein said molded inspection feature has a surface finish formed by a tool used to fabricate an exterior portion of said panel.

2. The enclosure of claim 1, wherein said plurality of panels is fabricated using tooling that has fabrication parameters specified in accordance with data stored in a cosmetic feature database.

3. The enclosure of claim 2, wherein said molded inspection feature is inspected by a spectrophotometer to analyze compliance of said molded inspection feature with predetermined color and surface finish characteristics.

4. The enclosure of claim 3, wherein said analysis by said spectrophotometer is performed using said cosmetic feature database.

5. The enclosure of claim 4, wherein the output of said spectrophotometer is provided to a comparator operable to compare the spectrophotometer output signal with data stored in said cosmetic feature database.

6. The enclosure of claim 5, wherein said molded inspection feature is located on an interior portion of said panel.

7. The enclosure of claim 6, wherein said molded inspection feature comprises the same surface texture as the surface texture of an external portion of said panel.

8. The enclosure of claim 6, wherein said molded inspection feature comprises a polished surface.

9. A method for fabricating enclosures for information handling systems, comprising:
   compiling a cosmetic feature statistical database;
   setting parameters for manufacturing tools based on information contained in said cosmetic feature statistical database;
   manufacturing enclosures for information handling systems using said cosmetic feature database, said enclosures having at least one panel comprising an inspection feature at a predetermined location thereon, wherein said inspection feature is formed on material having the same color characteristics as said panel, and wherein said inspection feature has a surface finish formed by a tool used to fabricate an exterior portion of said enclosures;
   obtaining a sample of material from one of said enclosures for information handling systems;
   performing optical inspection of cosmetic parameters of said sample; and
   using said information from said cosmetic feature database to verify compliance of polymer materials in said enclosures for said information handling systems with predetermined standards.

10. The method of claim 9, wherein said optical inspection of said sample is conducted using a spectrophotometer.

11. The method of claim 10, wherein said optical inspection of said sample by said spectrophotometer is performed using said data from said cosmetic feature database.

12. The method according to claim 11, wherein said spectrophotometer provides an output signal and said output signal is used by a comparator to compare the spectrophotometer output signal to data stored in said cosmetic feature database.

13. The method according to claim 12, wherein said comparator generates an output signal that is used to adjust tooling in a manufacturing facility to fabricate said enclosures in accordance with said predetermined standards.

14. The method of claim 9, wherein said molded inspection feature is located on an interior portion of said panel.

15. The method of claim 9, wherein said molded inspection feature comprises the same surface texture as the surface texture of an external portion of said panel.

16. The method of claim 9, wherein said molded inspection feature comprises a polished surface.

17. An information handling system comprising:
   a data processor;
   a data storage device operably connected to said data processor; and
   a plurality of input-output devices operably connected to said data processor;
   wherein said information handling system is contained in an enclosure, comprising:
      a plurality of panels fabricated from a polymer material; and
      a molded inspection feature on a portion of at least one of said panels, wherein said molded inspection feature is formed on material having the same color characteristics as said panel, and wherein said molded inspection feature has a surface finish formed by a tool used to fabricate an exterior portion of said panel.

18. The enclosure of claim 17, wherein said plurality of panels is fabricated using tooling that has fabrication parameters specified in accordance with data stored in a cosmetic feature database.

19. The enclosure of claim 18, wherein said molded inspection feature is inspected by a spectrophotometer to analyze compliance of said molded injection feature with predetermined color and surface finish characteristics.

20. The enclosure of claim 19, wherein said analysis by said spectrophotometer is performed using said cosmetic feature database.

* * * * *